United States Patent [19]

Shinji

[11] Patent Number: 5,466,391
[45] Date of Patent: Nov. 14, 1995

[54] GRANULATED AGENT AND CATALYST USED FOR OXYGEN GENERATION

[75] Inventor: Ueno Shinji, Tokyo, Japan

[73] Assignee: Genox Co. Ltd., Seoul, Rep. of Korea

[21] Appl. No.: 264,163

[22] Filed: Jun. 21, 1994

[51] Int. Cl.$^6$ ............................. C09D 101/28; C11D 7/54
[52] U.S. Cl. ............................. 252/186.27; 252/186.32; 106/171; 106/197.2
[58] Field of Search ................................. 106/171, 197.2; 252/186.27, 186.32

[56] References Cited

U.S. PATENT DOCUMENTS 5,336,433 8/1994 Lagnemo et al. .................. 252/186.23

*Primary Examiner*—David Brunsman
*Attorney, Agent, or Firm*—Maria Parrish Tungol

[57] ABSTRACT

Improved oxygen generating agents and oxygen generating catalysts are disclosed. The oxygen generating agent comprises sodium carbonate peroxyhydrate, $2Na_2CO_3.3H_2O_2$, as an oxygen generating source and calcium carboxymethyl cellulose (Ca-CMC) as a bonding agent. The oxygen generating catalyst comprises hydrogen peroxidase as an essential ingredient, and salt cake and polyvinyl alcohol (PVA) as accessory ingredients. The hydrogen peroxidase, the salt cake and the PVA are kneaded with each other and, thereafter, granulated or tabletted so as to form the catalyst. The oxygen generating agent of this invention provides a stable oxygen supply for a long time. This agent is also remarkably improved in its preservation. The oxygen generating catalyst permits free control of the lasting time of oxygen generating reaction. This catalyst can be preserved free from deterioration of its performance for a long time.

4 Claims, No Drawings

1

GRANULATED AGENT AND CATALYST USED FOR OXYGEN GENERATION

BACKGROUND OF THE INVENTION

1. Field of the Invention

The present invention relates in general to both an oxygen generating agent and an oxygen generating catalyst used for oxygen supply and, more particularly, to both a granulated oxygen generating agent of the sodium carbonate peroxyhydrate suitable for use in continuous generation of a desired amount of oxygen for a long time and an oxygen generating catalyst for reaction with the above oxygen generating agent while free controlling both the generation amount of oxygen and the oxygen generating reaction time.

2. Description of the Prior Art

It is well known to those skilled in the art that the oxygen can be generated by adding water to sodium carbonate peroxyhydrate $2Na_2CO_3.3H_2O_2$, which peroxyhydrate is used as an oxygen generating source, in the presence of catalyst.

In order to not only prevent abrupt generation of large amount of oxygen but also assure stable and constant supply of a predetermined amount of oxygen for a long time, Japanese patent Laid-open Publication No. Sho. 60-44242 discloses a method for solidifying the sodium carbonate peroxyhydrate using varieties of arabic pastes having different concentrations.

Japanese Patent No. Hesei. 3-53907 discloses an oxygen generating agent. This oxygen generating agent is produced by coating a water-soluble layer such as a polyethylene glycol layer on the sodium carbonate peroxyhydrate and forming a micro capsule of the sodium carbonate peroxyhydrate. The sodium carbonate peroxyhydrate micro capsule is, thereafter, applied with catalase particles or rheonate on its water-soluble coating. The above oxygen generating agent is preferably used for continuous supply of oxygen for a week or a month.

However, the oxygen generating agent disclosed in Japanese Patent No. Hesei. 3-53907, while continuously generating the oxygen for a long time, that is, for a week or a month, nevertheless has a problem in that its production process should comprise many steps, thus increasing the cost of the result product. Furthermore, this oxygen generating agent is apt to naturally absorb moisture. Such moisture absorption causes deterioration of both quality and preservation of the agent.

In order to produce oxygen generating catalysts, the above Japanese patent Laid-open Publication No. Sho. 60-44242 also discloses a method for solidifying a metal salt, used as an oxygen generating catalyst, using varieties of arabic pastes having different concentrations. On the other hand, the present inventors discloses, in Japanese Patent No. Hesei. 3-53907, the oxygen generating agent which is produced by coating the water-soluble layer, such as the polyethylene glycol layer, on the sodium carbonate peroxyhydrate and forming the micro capsule of the sodium carbonate peroxyhydrate and, thereafter, applying the micro capsule with catalase particles or rheonate on its water-soluble coating.

The oxygen generating reaction according to the above method disclosed in Japanese Patent Laid-open Publication No. Sho. 60-44242 is continued for about 20–30 mins., so that this method can be effectively used for first aid. However, since this method generates the oxygen for such a relatively short time, it can not be used in certain situations such as for transportation of marine products requiring continuous oxygen supply for at least one hour. Furthermore, in the above method, a metal salt such as manganese dioxide or manganese sulfate should be used as the oxygen generating catalyst, so that the reaction sewage inevitably includes environmental contaminants. The contaminant-laden sewage will kill the marine products during the transportation of marine products.

Meanwhile, the method of Japanese Patent No. Hesei. 3-53907 wherein the oxygen generating agent is produced by forming the micro capsule of the sodium carbonate peroxyhydrate at the same time of applying the catalase particles or rheonate on the water-soluble coating of the micro capsule, requires a complex production process, thus increasing its cost. This oxygen generating agent is also apt to naturally absorb moisture, which moisture will cause deterioration of quality and preservation of the oxygen generating agent.

SUMMARY OF THE INVENTION

It is, therefore, an object of the present invention to provide an improved oxygen generating agent in which the aforementioned problems can be overcome and which is easily handled, stably continues generation of a predetermined amount of oxygen and shows excellent preservation.

It is another object of the present invention to provide an improved oxygen generating catalyst which is suitable for used in oxygen supply for a long time such as in transportation of marine products and removes the harmfulness of the reactants and freely controls both the generation amount of oxygen and the oxygen generating reaction time.

In an aspect, the present invention provides an oxygen generating agent comprising sodium carbonate peroxyhydrate, $2Na_2CO_3.3H_2O_2$, used as an oxygen generating source and calcium carboxymethyl cellulose (Ca-CMC) used as a bonding agent.

In another aspect, the present invention provides an oxygen generating catalyst comprising hydrogen peroxidase as an essential ingredient, and salt cake and polyvinyl alcohol (PVA) as accessory ingredients, whereby the hydrogen peroxidase, the salt cake and the PVA are kneaded with each other and, thereafter, granulated or tabletted so as to form the catalyst.

The oxygen generating agent of this invention maintains the oxygen generating reaction for a long time, thus achieving the object of stable oxygen supply for a long time. The agent is also remarkably improved in its preservation. Meanwhile, the oxygen generating catalyst of this invention freely controls the lasting time of oxygen generating reaction. This catalyst can be preserved free from deterioration of its performance for a long time.

DESCRIPTION OF THE PREFERRED EMBODIMENTS

The Ca-CMC (Ca-carboxymethyl cellulose), which will be used as a bonding agent of an oxygen generating agent according to the present invention, is intrinsically harmless to the human body. This Ca-CMC also abruptly increases its volume when it absorbs moisture. The Ca-CMC has been thus typically used as a disintegration agent for tablet medicine or granule medicine. However in the present invention, the Ca-CMC is used as a bonding agent as well as a disintegration agent since it overcomes the problems caused by the conventional bonding agents. That is, use of the conventional bonding agents such as gelatin, arabic rubber and glucose is attended with problems in that long time interval should be present from contact timing of the bonding agents with the water to start timing of oxygen generation. Furthermore, the conventional bonding agents remain as impurities such as foam in the water after reaction. However, the Ca-CMC of the present invention overcomes the above problems so that it can be used as a bonding agent as well as a disintegration agent in the present invention. In the present invention, it is preferred to use 1–3 weight % of Ca-CMC. Use of Ca-CMC less than 1 weight % will achieve no desired bonding effect, while use of Ca-CMC more than 3 weight % will result in generation of much more impurities.

In the present invention, it is preferred to use calcium stearate or magnesium stearate as a release agent for causing smooth release of the tablet product from a mold after tabletting. When using the above release agent in tabletting, a collateral advantage of generation of few impurities such as foam after tabletting will be achieved. In the present invention, it is preferred to use about 0.1 weight % of the above release agent.

The salt cake which is used in the oxygen generating catalyst of the present invention has been widely used in the drying of organic solvent. The salt cake used in the catalyst of the present invention is $Na_2SO_4$ in the anhydrous form. The salt cake gradually absorbs moisture and becomes a ten-hydrate salt. When kneading the salt cake with hydrogen peroxidase prior to drying of the kneaded mixture, the salt cake gradually activates the hydrogen peroxidase for a long time.

In the present invention, it is required to add a water-soluble and harmless tackifier to the mixture of the salt cake and the hydrogen peroxidase to continuously dry and retain the mixture. Examples of the tackifiers used in the present invention are polyvinyl alcohol (PVA), dextrin and starch, however, it is most preferable to use PVA as the tackifier.

Appropriate amounts of salt cake and PVA with respect to the hydrogen peroxidase are determined in accordance with a desired lasting time of the oxygen generating reaction. It is preferred to add about 80–95 weight parts of salt cake and PVA to about 5–20 weight parts of hydrogen peroxidase in the present invention. In this case, the resulting granules or tablets are remarkably improved in their preservation. When using the oxygen generating catalyst of the present invention along with the above oxygen generating agent of the tablet type, it is possible to appropriately control the lasting time of the oxygen generating reaction.

Both the oxygen generating catalyst and the oxygen generating agent of the tablet type of the present invention show no deterioration of their functions even when absorbing moisture. Furthermore, both the oxygen generating catalyst and the oxygen generating agent of the tablet type retain their resting stages owing to the presence of bonding agent or of compound of crystallization and tackifier. The oxygen generating catalyst of the present invention may be thus added to the oxygen generating agent of the tablet type so as to be micro-capsulated or granulated and to be preserved in a single body.

The following examples and comparative examples are merely intended to illustrate the present invention in further detail and should by no means be considered to limitative of the scope of the invention.

EXAMPLE 1

98.95 g of sodium carbonate peroxyhydrate, 1 g of Ca-CMC and 0.05 g of calcium stearate were kneaded with each other. The result kneaded mixture was tabletted so as to form tablets of 9 mm diameter. After putting one hundred tablets in water, time to start of oxygen generation, lasting time of the oxygen generation, oxygen generation state, disintegration state and the state of impurities suspended in the water after oxygen generating reaction were measured. The measured results are given in Table 1.

EXAMPLE 2

The procedure of Example 1 was repeated, substituting 97.9 g of sodium carbonate peroxyhydrate, 2 g of Ca-CMC and 0.1 g of calcium stearate for 98.95 g of sodium carbonate peroxyhydrate, 1 g of Ca-CMC and 0.05 g of calcium stearate respectively. The measured results are given in Table 1.

EXAMPLE 3

The procedure of Example 1 was repeated, substituting 97.95 g of sodium carbonate peroxyhydrate, 2 g of Ca-CMC and 0.05 g of calcium stearate for 98.95 g of sodium carbonate peroxyhydrate, 1 g of Ca-CMC and 0.05 g of calcium stearate respectively. The measured results are given in Table 1.

EXAMPLE 4

The procedure of Example 1 was repeated, substituting 96.95 g of sodium carbonate peroxyhydrate, 3 g of Ca-CMC and 0.1 g of magnesium stearate for 98.95 g of sodium carbonate peroxyhydrate, 1 g of Ca-CMC and 0.05 g of calcium stearate respectively. The measured results are given in Table 1.

COMPARATIVE EXAMPLE 1

The procedure of Example 1 was repeated, substituting 99.3 g of sodium carbonate peroxyhydrate, 0.6 g of Ca-CMC and 0.1 g of calcium stearate for 98.95 g of sodium carbonate peroxyhydrate, 1 g of Ca-CMC and 0.05 g of calcium stearate respectively. The measured results are given in Table 1.

COMPARATIVE EXAMPLE 2

The procedure of Example 1 was repeated, substituting 96.4 g of sodium carbonate peroxyhydrate, 3.5 g of Ca-CMC and 0.1 g of calcium stearate for 98.95 g of sodium carbonate peroxyhydrate, 1 g of Ca-CMC and 0.05 g of calcium stearate respectively. The measuring results are given in Table 1.

COMPARATIVE EXAMPLE 3

The procedure of Example 1 was repeated, substituting 15 g of arabic rubber of a conventional bonding agent for 3.5 g of Ca-CMC. The measured results are given in Table 1.

TABLE 1

| | Ex. 1 | Ex. 2 | Ex. 3 | Ex. 4 | Com. Ex. 1 | Com. Ex. 2 | Com. Ex. 3 |
|---|---|---|---|---|---|---|---|
| Time[1] (sec) | 28 | 28 | 25 | 24 | 32 | 23 | 190 |
| Time[2] (min) | 15 | 15 | 15 | 15 | 16 | 13 | 80 |
| State[1] | stable | stable | stable | stable | unstable (A-B-A)* | much stable | little for a long time |
| State[2] | good | good | good | good | relatively good | relatively good | bad |
| State[3] | little | little | little | little | a little | general | much |

Time[1]: Time to start of oxygen generation (sec)
Time[2]: Lasting time of oxygen generation (min)
State[1]: Oxygen generation state.
State[2]: Disintegration state.
State[3]: State of impurities suspended in the water.
*"A-B-A" denotes little-much-little

EXAMPLE 5

In order to test the performance deterioration of the product, the tablets produced by the procedure of Example 1 were let under room temperature and 80% of relative humidity for 100 days. After the lapse of 100 days, the measuring of Example 1 was repeated, however, the measured results of this example were equal to those of Example 1.

As will be noted from the above Examples and Comparative Examples, the oxygen generating agent of the present invention starts generation of oxygen in a short time after putting in water, the oxygen generation lasts for a long time and generates no impurity in the water after the oxygen generating reaction unlike the conventional oxygen generating agent. Furthermore, the oxygen generating agent of this invention is easily handled and preserved since it is a tablet type agent.

EXAMPLE 6

10 weight parts of hydrogen peroxidase, 30 weight parts of salt cake and 60 weight parts of PVA were kneaded with each other. Thereafter, granules of 3 mm diameter and 4 mm length were produced from the result kneaded mixture and dried, to form oxygen generating catalysts of the present invention. 1 g of the above catalyst and 70 g of oxygen generating agent of the tablet type produced by the procedure of Example 1 were put in an oxygen generating vessel prior to addition of water into the vessel. As a result of addition of water into the vessel, oxygen was generated. Both flow rate of generated oxygen and temperature of oxygen generating reaction chamber in accordance with the lapse of time were measured. The measured results are given in Table 2.

TABLE 2

| Lapse of Time (min) | Flow rate* (l/min) | Temperature** (°C.) |
|---|---|---|
| 1 | 0.46 | 18 |
| 2 | 0.42 | |
| 3 | 0.40 | |
| 4 | 0.40 | |
| 5 | 0.40 | |
| 6 | 0.39 | |
| 7 | 0.36 | |
| 8 | 0.35 | 21 |
| 9 | 0.33 | |
| 10 | 0.30 | |
| 11 | 0.28 | |
| 12 | 0.28 | |
| 13 | 0.26 | |
| 14 | 0.24 | |
| 15 | 0.20 | |
| 16 | 0.18 | |
| 17 | 0.16 | |
| 18 | 0.10 | 26 |

*: Flow rate of generated oxygen
**: Temperature of reaction chamber

EXAMPLE 7

In order to test the performance deterioration of the product, the tablets produced by the procedure of Example 6 were left at under room temperature and 80% of relative humidity for 30 days. After the lapse of 30 days, the measuring of Example 1 was repeated, however, the measuring results of this example were equal to those of Example 1.

EXAMPLE 8

The oxygen generating agent of Example 1 was granulated into granules of mean diameter of 2 mm. The result granules were in turn added with the oxygen generating catalyst granules of Example 6 and, thereafter, preserved for 10 days. After the lapse of 10 days, the measuring of Example 6 was repeated, however, the measuring results of this Example were equal to those of Example 6.

COMPARATIVE EXAMPLE 4

The procedure of Example 6 was repeated, substituting 1 g of hydrogen peroxidase for 1 g of catalyst. In this comparative example, the oxygen generating reaction ended in 6 minutes and no oxygen was generated after 6 minutes.

As described above, the oxygen generating catalyst of the present invention shows no deterioration of its performance when absorbing moisture. Furthermore, the oxygen generating catalyst stably generates the oxygen for a long time by simply putting in water, thus achieving the object of a desired stable oxygen supply for a long time. When using the oxygen generating catalyst along with the oxygen generating agent of the present invention in the generation of oxygen, they are consumed nearly at the same time so that there is no problem of remaining of catalyst and of environmental contaminants after finishing the oxygen generating reaction. Another advantage of the present invention is that both the oxygen generating catalyst and the oxygen generating agent retain their resting stages until they are practically used. The oxygen generating catalyst may be thus added to the oxygen generating agent so as to be micro-capsulated or granulated and to be preserved in a single body.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An oxygen generating agent comprising:

sodium carbonate peroxyhydrate, as an oxygen generating source; and calcium carboxymethyl cellulose as a bonding agent.

2. The oxygen generating agent according to claim 1, wherein the amount of calcium carboxymethyl cellulose ranged from 1 weight % to 3 weight %.

3. The oxygen generating agent according to claim 2 further comprising calcium stearate or magnesium stearate as a release agent.

4. The oxygen generating agent according to claim 1 further comprising calcium stearate or magnesium stearate as a release agent.

* * * * *